(12) United States Patent
Troia et al.

(10) Patent No.: US 11,928,246 B2
(45) Date of Patent: *Mar. 12, 2024

(54) MEMORY DATA SECURITY

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 451 days.

This patent is subject to a terminal disclaimer.

(21) Appl. No.: 17/346,908

(22) Filed: Jun. 14, 2021

(65) Prior Publication Data
US 2021/0303733 A1 Sep. 30, 2021

Related U.S. Application Data

(63) Continuation of application No. 16/216,532, filed on Dec. 11, 2018, now Pat. No. 11,036,887.

(51) Int. Cl.
*H04L 29/06* (2006.01)
*G06F 12/0868* (2016.01)
(Continued)

(52) U.S. Cl.
CPC .......... *G06F 21/64* (2013.01); *G06F 12/0868* (2013.01); *G06F 12/0882* (2013.01);
(Continued)

(58) Field of Classification Search
CPC .. G06F 21/64; G06F 12/0868; G06F 12/0882; G06F 12/1408; G06F 12/1441;
(Continued)

(56) References Cited

U.S. PATENT DOCUMENTS 5,386,155 A 1/1995 Steele et al.
5,826,007 A 10/1998 Sakaki et al.
(Continued)

FOREIGN PATENT DOCUMENTS

CN 1747385 A * 3/2006
CN 102184365 9/2011
(Continued)

OTHER PUBLICATIONS

U.S. Appl. No. 15/687,069, entitled, "Methods of Memory Address Verification and Memory Devices Employing the Same," filed Aug. 25, 2017, Client Reference No. 2017-0254.00/US, (24 pgs.).
(Continued)

*Primary Examiner* — Sher A Khan
(74) *Attorney, Agent, or Firm* — Brooks, Cameron & Huebsch, PLLC

(57) ABSTRACT

Content within a memory device (e.g., a DRAM) may be secured in a customizable manner. Data can be secured and the memory device performance by be dynamically defined. In some examples, setting a data security level for a group of memory cells of a memory device may be based, at least in part, on a security mode bit pattern (e.g., a flag, flags, or indicator) in metadata read from or written to the memory device. Some examples include comparing a first signature (e.g., a digital signature) in metadata to a second value (e.g., an expected digital signature) to validate the first value in the metadata. The first value and the second value can be based, at least in part, on the data security level. Some examples include performing a data transfer operation in response to validation of the first and/or second values.

20 Claims, 6 Drawing Sheets

(51) Int. Cl.
*G06F 12/0882* (2016.01)
*G06F 12/14* (2006.01)
*G06F 13/16* (2006.01)
*G06F 21/64* (2013.01)
*G06F 21/78* (2013.01)

(52) U.S. Cl.
CPC ...... *G06F 12/1408* (2013.01); *G06F 12/1441* (2013.01); *G06F 13/1673* (2013.01); *G06F 21/78* (2013.01); *G06F 2212/1052* (2013.01)

(58) Field of Classification Search
CPC .............. G06F 13/1673; G06F 21/78; G06F 2212/1052; G06F 3/0622; G06F 3/0629; G06F 3/0679; G06F 21/79
See application file for complete search history.

(56) References Cited

U.S. PATENT DOCUMENTS

| | | | |
|---|---|---|---|
| 6,052,468 A | 4/2000 | Hillhouse | |
| 6,643,777 B1 | 11/2003 | Chu | |
| 6,857,076 B1 | 2/2005 | Klein | |
| 7,155,590 B2 | 12/2006 | Mathis | |
| 7,623,378 B1 | 11/2009 | Wahlstrom et al. | |
| 7,634,629 B2 * | 12/2009 | Nemiroff | G06F 21/805 711/163 |
| 8,090,886 B2 * | 1/2012 | Phan | G06F 21/83 710/72 |
| 8,448,239 B2 | 5/2013 | O'Connor et al. | |
| 8,930,714 B2 | 1/2015 | Glew et al. | |
| 9,037,788 B2 * | 5/2015 | Rudelic | G11C 14/0045 711/100 |
| 9,164,927 B2 * | 10/2015 | Du | G06F 21/78 |
| 9,767,272 B2 | 9/2017 | Shanbhogue et al. | |
| 10,671,549 B2 | 6/2020 | Kikuchi | |
| 10,891,074 B2 | 1/2021 | Lee et al. | |
| 2002/0112162 A1 | 8/2002 | Cocotis et al. | |
| 2003/0229764 A1 | 12/2003 | Ohno et al. | |
| 2006/0015753 A1 | 1/2006 | Drehmel et al. | |
| 2007/0028036 A1 | 2/2007 | Roohparvar et al. | |
| 2007/0143555 A1 | 6/2007 | Nemiroff et al. | |
| 2009/0327535 A1 * | 12/2009 | Liu | G11C 7/1012 710/60 |
| 2011/0055513 A1 | 3/2011 | Lee | |
| 2011/0072491 A1 | 3/2011 | Lou et al. | |
| 2011/0194694 A1 | 8/2011 | Struik | |
| 2012/0084537 A1 | 4/2012 | Rudelic et al. | |
| 2012/0278635 A1 | 11/2012 | Hars et al. | |
| 2014/0006692 A1 * | 1/2014 | Berntsen | G06F 21/77 711/103 |
| 2014/0095753 A1 | 4/2014 | Crupnicoff et al. | |
| 2014/0108823 A1 * | 4/2014 | Rudelic | G06F 12/1408 713/193 |
| 2014/0143476 A1 | 5/2014 | Sela et al. | |
| 2014/0230063 A1 * | 8/2014 | Hamid | G06F 21/85 726/24 |
| 2014/0258599 A1 | 9/2014 | Rostoker | |
| 2014/0281827 A1 | 9/2014 | Twitto et al. | |
| 2016/0012890 A1 | 1/2016 | Park et al. | |
| 2016/0027508 A1 | 1/2016 | Lee et al. | |
| 2016/0028728 A1 * | 1/2016 | Hampel | H04L 9/3234 713/181 |
| 2016/0224404 A1 * | 8/2016 | Mehta | G06F 21/64 |
| 2018/0189493 A1 | 7/2018 | Schilder et al. | |
| 2018/0253258 A1 | 9/2018 | Chu et al. | |
| 2018/0267726 A1 * | 9/2018 | Sun | G06F 3/0622 |
| 2018/0329818 A1 | 11/2018 | Cheng et al. | |
| 2019/0098016 A1 * | 3/2019 | Jeon | H04L 63/0823 |
| 2019/0370439 A1 * | 12/2019 | Lin | G06F 21/78 |

FOREIGN PATENT DOCUMENTS

| | | | | |
|---|---|---|---|---|
| CN | 102571335 | | 4/2012 | |
| CN | 102541765 | | 7/2012 | |
| CN | 105280221 | | 1/2016 | |
| CN | 106330812 | | 1/2017 | |
| FR | 3028335 A1 * | 5/2016 | ............ G06F 21/35 |
| JP | 2011197912 | | 10/2011 | |
| WO | WO-2010052722 A1 * | 5/2010 | ............ G06F 21/79 |
| WO | WO-2020019267 A1 * | 1/2020 | ........... G06F 3/0619 |

OTHER PUBLICATIONS

U.S. Appl. No. 15/687,169, entitled, "Methods of Memory Address Verification and Memory Devices Employing the Same," filed Aug. 25, 2017, Client Reference No. 2017-0249.00/US, (26 pgs.).

\* cited by examiner

MEMORY DATA SECURITY

PRIORITY INFORMATION

This application is a Continuation of U.S. application Ser. No. 16/216,532, filed Dec. 11, 2018, which issues as U.S. Pat. No. 11,036,887 on Jun. 15, 2021, the contents of which are included herein by reference.

TECHNICAL FIELD

The present disclosure relates generally to semiconductor memory and methods, and more particularly, to apparatuses, systems, and methods for memory data security.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1A:
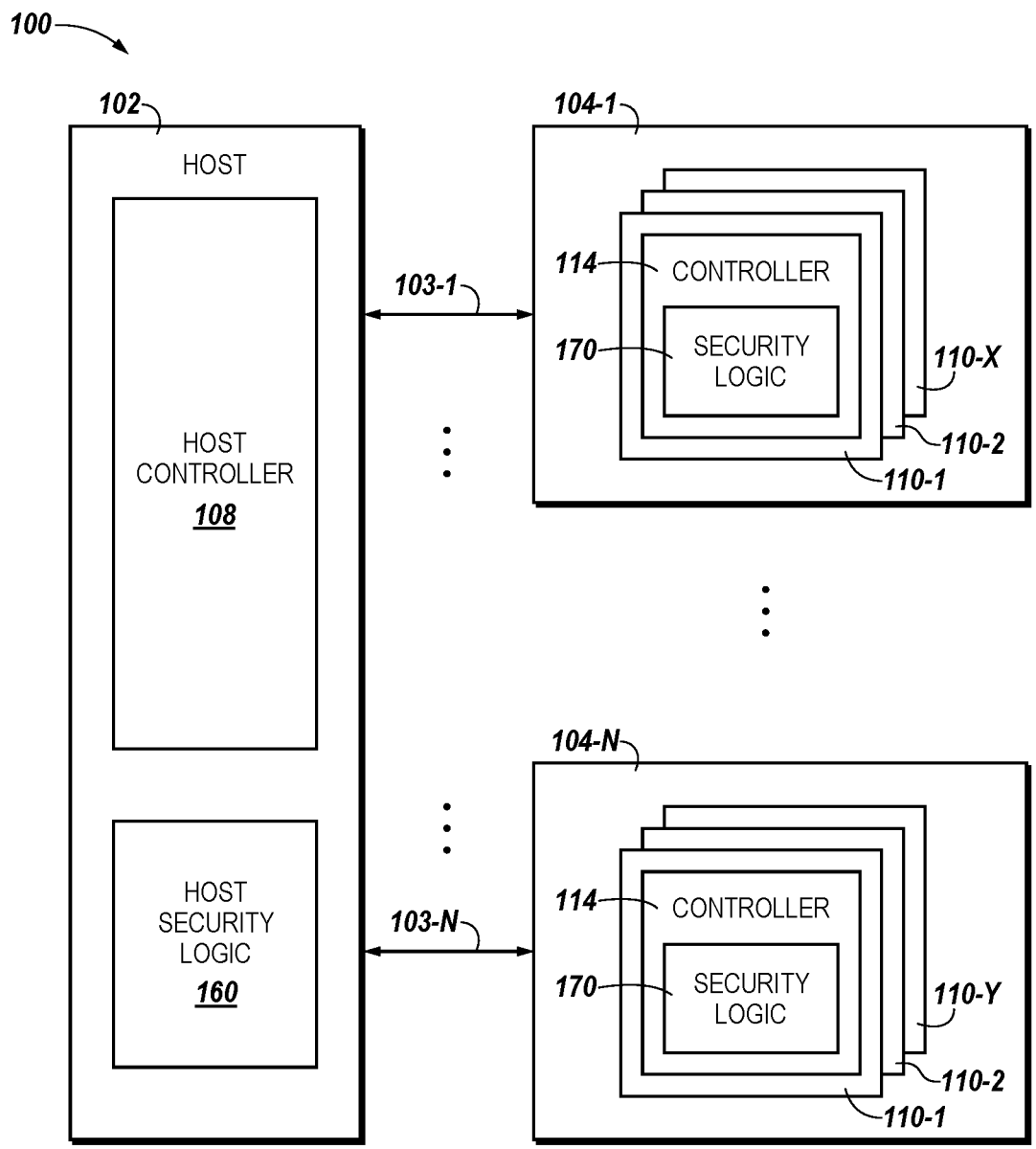
FIG. 1A is a functional block diagram in the form of a computing system including an apparatus including a number of memory systems, in accordance with one or more embodiments of the present disclosure.

Methods, systems, and apparatuses related to secure memory access are described. Content with in a memory device (e.g., a DRAM) may be secured in a customizable manner. Data can be secured and the memory device performance by be dynamically defined. In some examples, setting a data security level for a group of memory cells of a memory device may be based, at least in part, on a security mode bit pattern (e.g., a flag, flags, or indicator) in metadata read from or written to the memory device. Some examples include comparing a first signature (e.g., a digital signature) in metadata to a second value (e.g., an expected digital signature) to validate the first value in the metadata. The first value and the second value can be based, at least in part, on the data security level. Some examples include performing a data transfer operation in response to validation of the first and/or second values.

Memory devices may be used to store important or critical data in a computing device and can transfer such data between a host associated with the computing device. As the importance or criticality of the data increases, it may be desirable to provide security to the data and/or include security measures as part of the data transfer process. This may mitigate or eliminate malicious attacks (e.g., un-authorized access) to data that is stored in the memory device or transferred between the memory device and the host.

In some approaches, certain portions of memory device (e.g., specific groups of memory cells, pages of memory, etc.) may be set at manufacture to include certain encryptions. An operating system of a host coupled to the memory device may maintain access permissions for the memory device for the predefined portions of the memory device. While this allows a modicum of protection of critical data, such approaches may not allow for protection of certain types of malicious attacks (e.g., cold boot attacks, etc.).

Further, some approaches may be unable to prevent malicious attacks in which service data and/or temporary data associated with the host (or applications running on the host) are modified by, for example, a nefarious entity. Modification of such data may be achieved by, for example, a man-in-the-middle attack, a cold boot attack, DRAM remanence, or other techniques.

In order to mitigate or eliminate the efficacy of such data modification techniques, examples of the present disclosure can provide secure access to the memory device and/or host through the use of various secure signature (e.g., cryptographic) schemes. In addition, embodiments disclosed herein can allow for dynamic, customizable security levels to be applied to the memory device on a group-by-group (e.g., a page-by-page) basis.

By providing varying levels of security to the memory device on a page-by-page basis and/or by generating and comparing signatures based on the security level assigned to a particular group of memory cells, such as a page of the memory device, data security may be improved in comparison to approaches in which comparatively lower encryption schemes are provided to statically allocated pages of the memory device.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "X," "Y," "N," "WI," "A," "B," "C," "D," etc., particularly with respect to reference numerals in the drawings, indicate that a number of a particular feature so designated can be included. It is also to be understood that the terminology used herein is for the purpose of describing particular embodiments only, and is not intended to be limiting. As used herein, the singular forms "a", "an", and "the" can include both singular and plural referents, unless the context clearly dictates otherwise. In addition, "a number of", "at least one", and "one or more" (e.g., a number of memory banks) can refer to one or more memory banks, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1A is a functional block diagram in the form of a computing system 100 including an apparatus including a number of memory systems 104-1, . . . , 104-N, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1A, memory systems 104-1 . . . 104-N can include a one or more memory modules (e.g., single in-line memory modules, dual in-line memory modules, etc.) 110-1, . . . , 110-X, 110-Y. The memory modules 110-1, . . . , 110-X, 110-Y can include volatile memory and/or non-volatile memory. In a number of embodiments, memory systems 104-1, . . . , 104-N can include a multi-chip device. A multi-chip device can include a number of different memory types and/or memory modules. For example, a memory system can include non-volatile or volatile memory on any type of a module.

In FIG. 1A, memory system 104-1 is coupled to the host via channel 103-1 can include memory modules 110-1, . . . , 110-X that can include main memory (e.g., DRAM) modules. In this example, each memory module 110-1, . . . , 110-X, 110-Y includes a controller 114. The controller 114 can receive commands from host 102 and control execution of the commands on a memory module 110-1, . . . , 110-X, 110-Y.

As illustrated in FIG. 1A, a host 102 can be coupled to the memory systems 104-1 . . . 104-N. In a number of embodiments, each memory system 104-1 . . . 104-N can be coupled to host 102 via a channel (e.g., channels 103-1, . . . , 103-N). In FIG. 1A, memory system 104-1 is coupled to host 102 via channel 103-1 and memory system 104-N is coupled to host 102 via channel 103-N. Host 102 can be a host system such as a personal laptop computer, a desktop computer, a digital camera, a smart phone, a memory card reader, and/or internet-of-thing enabled device, among various other types of hosts and can include a memory access device, e.g., a processor. One of ordinary skill in the art will appreciate that "a processor" can intend one or more processors, such as a parallel processing system, a number of coprocessors, etc.

The host 102 can include a system motherboard and/or backplane and can include a number of processing resources (e.g., one or more processors, microprocessors, or some other type of controlling circuitry). The system 100 can include separate integrated circuits or both the host 102 and the memory systems 104-1, . . . , 104-N can be on the same integrated circuit. The system 100 can be, for instance, a server system and/or a high performance computing (HPC) system and/or a portion thereof. Although the example shown in FIG. 1A illustrate a system having a Von Neumann architecture, embodiments of the present disclosure can be implemented in non-Von Neumann architectures, which may not include one or more components (e.g., CPU, ALU, etc.) often associated with a Von Neumann architecture.

Host 102 includes a host controller 108 to communicate with memory systems 104-1 . . . 104-N. The host controller 108 can send commands to the DIMMs 110-1, . . . , 110-X, 110-Y via channels 103-1 . . . 103-N. The host controller 108 can communicate with the DIMMs 110-1, . . . , 110-X, 110-Y and/or the controller 114 on each of the DIMMs 110-1, . . . , 110-X, 110-Y to read, write, and erase data, among other operations. A physical host interface can provide an interface for passing control, address, data, and other signals between the memory systems 104-1 . . . 104-N and host 102 having compatible receptors for the physical host interface. The signals can be communicated between 102 and DIMMs 110-1, . . . , 110-X, 110-Y on a number of buses, such as a data bus and/or an address bus, for example, via channels 103-1 . . . 103-N.

The host 102 can include host security logic 160, which can include hardware and/or hard-wired logic configured to generate, calculate, and/or compare cryptographic has functions as part of memory device data security. For example, the host security logic 160 can append a digital signature (e.g., a cryptographic hash function) to data to be transferred to the memory system(s) 104-1, . . . , 104-N. This digital signature may be referred to in some embodiments as an "expected signature." The security logic 170 included on the memory systems 104-1, . . . , 104-N can calculate a digital signature and compare the calculated digital signature to the expected signature to determine if the two signatures match, as described in more detail, herein. As used herein, the terms "digital signature" and "expected digital signature" can be referred to as a "value in the metadata" and a "determined value," respectively. For example, a first value in the metadata can refer to a digital signature, and a second value determined from one or more flags (e.g., security mode flags, security mode bit patterns, etc.) can refer to an expected digital signature.

Similarly, the security logic 170 can append, concatenate, or otherwise cause a digital signature (e.g., a cryptographic hash function) to be included in data to be transferred to the host 102. In this case, this digital signature may be referred to the "expected signature." The host security logic 160 can calculate a digital signature and compare the calculated digital signature to the expected signature to determine if the two signatures match, as described in more detail, herein.

The host controller 108 and/or controller 114 on a memory module can include control circuitry, e.g., hardware, firmware, and/or software. In one or more embodiments, the host controller 108 and/or controller 114 can be an application specific integrated circuit (ASIC) and/or a field programmable gate array (FPGA) coupled to a printed circuit board including a physical interface. Although not explicitly shown in FIG. 1A, each memory module 110-1, . . . , 110-X, 110-Y can include buffers of volatile and/or non-volatile memory and registers. Buffer can be used to buffer data that is used during execution of commands.

The memory modules 110-1, . . . , 110-X, 110-Y can provide main memory for the memory system or could be used as additional memory or storage throughout the memory system. Each memory module 110-1, . . . , 110-X, 110-Y can include one or more arrays of memory cells, e.g., volatile and/or non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1A can include additional circuitry that is not illustrated so as not to obscure embodiments of the present disclosure. For example, the memory systems 104-1 . . . 104-N can include address circuitry to latch address signals provided over I/O connections through I/O circuitry. Address signals can be received and decoded by a row decoder and a column decoder to access the memory modules 110-1, . . . , 110-X, 110-Y. It will be appreciated by those skilled in the art that the number of address input connections can depend on the density and architecture of the modules 110-1, . . . , 110-X, 110-Y.

Figure 1B:
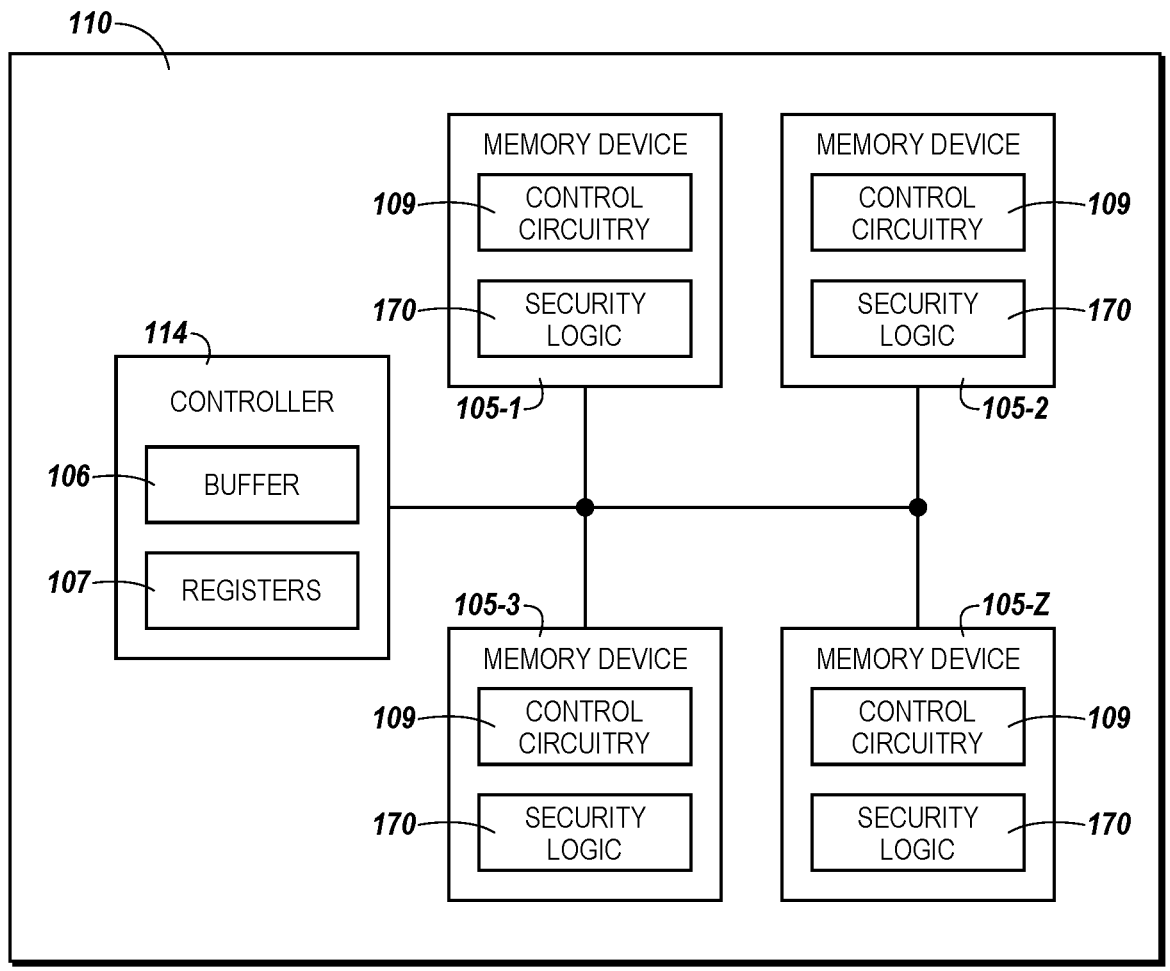
FIG. 1B is a block diagram of an apparatus in the form of a memory module in accordance with a number of embodiments of the present disclosure.

FIG. 1B is a block diagram of an apparatus in the form of a memory module 110 in accordance with a number of embodiments of the present disclosure. In FIG. 1B, the memory module 110 can include a controller 114. The controller 114 can include memory, such as SRAM memory, that can be a buffer 106 and/or a number of registers 107. The memory module 110 can include a number of memory devices 105-1, . . . , 105-Z coupled to the controller. Memory devices 105-1, . . . , 105-Z can be volatile and/or non-volatile memory devices and can include non-volatile memory arrays and/or volatile memory arrays. Memory devices 105-1, . . . , 105-Z can include control circuitry 109 (e.g., hardware, firmware, and/or software) which can be used to execute commands on the memory devices 105-1, . . . , 105-Z. The control circuitry 109 can receive commands from controller 114. The control circuitry 109 can be configured to execute commands to read and/or write data in the memory devices 105-1, . . . , 105-Z.

The memory devices 105-1, . . . , 105-N can include security logic 170. As described in more detail, herein, the security logic 170 can be responsible for generation (e.g., calculation) of digital signatures and/or comparison of a generated digital signature to an expected digital signature. In some embodiments, the security logic 170 can also be responsible for setting data security levels for groups of memory cells of the memory devices 105-1, . . . , 105-N. The data security levels can be set on a page-by-page basis. For example, different pages of memory cells of the memory devices 105-1, . . . , 105-N can be set to different data security levels dynamically, in contrast to approaches in which memory page data security levels are statically set at the manufacture stage of the memory device 105. The setting of pages of memory cells to the different data security levels can be in response to one or more flags within metadata included with data received (or generated) by the security logic 170, as described in more detail below. The one or more flags may be referred to herein as "security mode flags" or a "security mode bit pattern."

As used herein, the security logic 170 can include hardware and/or hard-wired logic configured to generate, calculate, and/or compare cryptographic has functions as part of memory device data security. Non-limiting examples of cryptographic has functions can include MD5 hash functions, secure hash algorithms (e.g., SHA-1, SHA-2, SHA-3, etc.) such as a SHA256 hash function, whirlpool hash functions, and/or BLAKE2 hash functions, among others.

Figure 2:
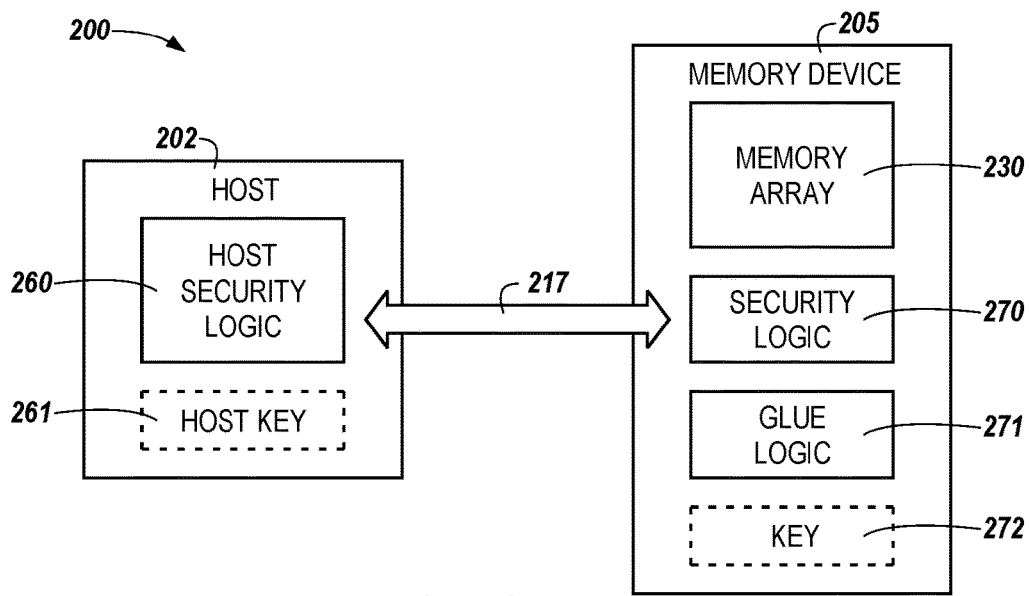
FIG. 2 is a block diagram of an apparatus in the form of a computing system including a host and a memory device in accordance with a number of embodiments of the present disclosure.

FIG. 2 is a block diagram of an apparatus 200 in the form of a computing system including a host 202 and a memory device 205 in accordance with a number of embodiments of the present disclosure. The host 202 can include host security logic 270, described above in connection with FIG. 1A and/or a host key 261. The memory device 205 includes a memory array 230, security logic 270, glue logic 271, and/or a key 272.

The memory array 230 can include memory cells, which can be arranged into groups (e.g., pages) of memory cells. In some embodiments, a page of memory cells can be approximately 4 kilo-bytes (KB), however, embodiments are not limited to this specific page size. As described above, the security logic 270 can set different pages of the memory array 230 to different data security levels.

The glue logic 271 can include hardware and/or logic and can be configured to provide an interface between multiple circuits in the memory device 205. For example, the glue logic 271 can be configured to perform simple logic functions (AND, NAND, OR, XOR, etc.), can include address decoding circuitry, can include buffers to protect the memory device 205 from overloads, and/or can provide voltage level conversion between various components of the memory device 205.

The host key 261 and/or the key 272 can be a piece of information (e.g., a parameter, a predefined sequence of bits, etc.) that determines the functional output of a cryptographic hash function. The host key 261 and/or the key 272 can specify a transformation of plaintext into ciphertext or vice versa, transformations of digital signatures, and/or transformation of message authentication codes. The host key 261 can be stored on the host 202 (e.g., in memory resident on the host 202), while the key 272 may be stored in the memory array 230 or may be stored in other storage associated with the memory device 205.

In some embodiments, the host 202 can generate a data transmission (e.g., data transmission 319 illustrated in FIG. 3, herein) and transmit the data transmission to the memory device 205. The memory device 205 can receive the data transmission from the host 202. The data transmission may be sent and/or received between the host 202 and the memory device 205 via an interface 217. In some embodiments, the interface 217 can be a dual data rate (DDR) interface.

Figure 3:
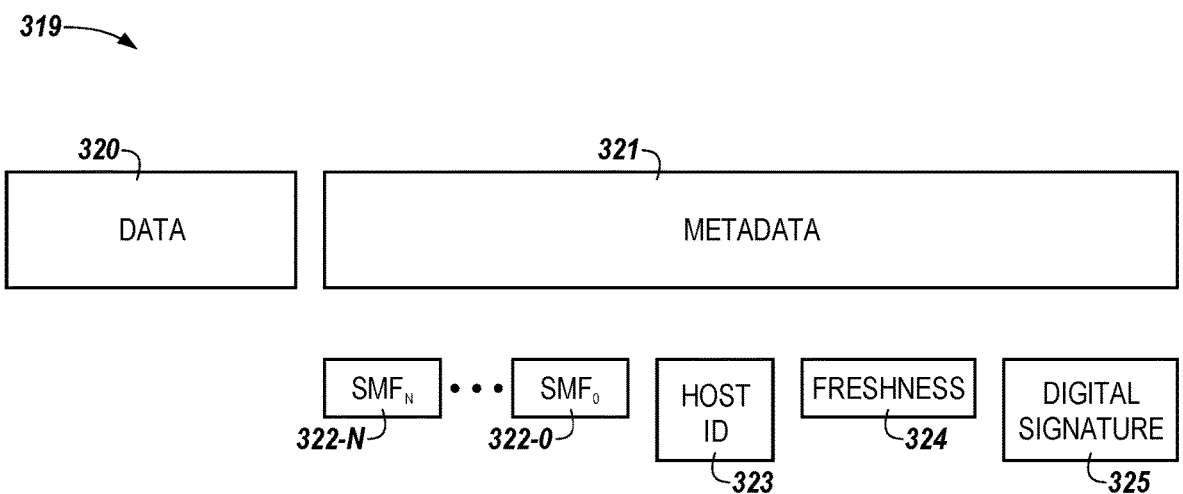
FIG. 3 is a block diagram of a data transmission in accordance with a number of embodiments of the present disclosure.

The data transmission can include host data (e.g., data 320 illustrated in FIG. 3, herein) to be stored in the memory array 230 and/or metadata (e.g., metadata 321 illustrated in FIG. 3, herein). The metadata can be appended to the host data (e.g., concatenated to the host data). In some embodiments, the metadata can be appended to the data transmission by the host security logic 260. As described in more detail in connection with FIG. 3, the metadata can include multiple fields that can be used by the security logic 270 as part of memory data security in accordance with the disclosure.

For example, the data transmission can include one or more flags (e.g., security mode flags, a security mode bit pattern, etc.), such as the security mode flags (SMF) 322-0, . . . , 322-N illustrated in FIG. 3, which can be used by the security logic 270 to set a data security level for one or more groups of memory cells of the memory device 205. The data transmission can further include a value, which may be a digital signature (e.g., digital signature 325 illustrated in FIG. 3) that is generated by the host security logic 270 of the host 202. In examples in which the host 202 generates the digital signature, the digital signature may be referred to herein as an "expected signature." The data transmission can further include a host identification (ID) field (e.g., host ID field 323 illustrated in FIG. 3, herein) and/or a freshness field (e.g., freshness field 324 illustrated in FIG. 3, herein).

In response to receipt of the data transmission, the security logic 270 can determine a corresponding data security level associated with the data transmission, calculate a digital signature for the data transmission using the metadata, and compare the calculated digital signature to the expected digital signature to determine if the calculated digital signature matches the expected digital signature. If the calculated digital signature matches the expected digital signature, the security logic 270 can cause the data and/or the metadata associated with the data transmission to be stored in the memory array 230 of the memory device 205.

Conversely, the security logic 270 of the memory device 205 can, in response to a request for data from the host 202, cause metadata to be appended to data to be consumed by the host (e.g., read data). The metadata generated by the security logic 270 can include a digital signature that is generated by the security logic 270. In examples in which the memory device 205 generates the digital signature, the digital signature may be referred to herein as an "expected signature." The data transmission can further include one or more flags (e.g., security mode flags, security mode bit patterns, etc.), a host identification (ID) field and/or a freshness field.

In response to receipt of the data transmission from the memory device 230, the host security logic 260 can calculate a digital signature for the data transmission using the metadata and compare the calculated digital signature to the expected digital signature to determine if the calculated digital signature matches the expected digital signature. If the calculated digital signature matches the expected digital signature, the host security logic 260 can cause the data and/or the metadata associated with the data transmission to be processed by the host 202.

FIG. 3 is a block diagram of a data transmission 319 in accordance with a number of embodiments of the present disclosure. As shown in FIG. 3, the data transmission 319 can include data 320 and metadata 321. The metadata 321 can be appended to the data 320 such that the data transmission 319 forms a contiguous string of bits. The data 320 can be host data or read data depending on whether the data transmission 319 originates from a host (e.g., host 202 illustrated in FIG. 2, herein) or a memory device (e.g., memory device 205 illustrated in FIG. 2, herein). For example, if the data transmission 319 is generated by the host (e.g., the data transmission 319 is utilized as part of a write operation), the data 320 can include host data. If the data transmission 319 is generated by the memory device (e.g., if the data transmission 319 is utilized as part of a read operation), the data 320 can include data stored by the memory device.

The metadata 321 can include various fields that can be generated and/or used by the host security logic (e.g., host security logic 260 illustrated in FIG. 2, herein) and/or the security logic (e.g., security logic 270 illustrated in FIG. 2, herein). For example, in some embodiments, the metadata 321 can include various security fields (e.g., security mode bit patterns 322-0, . . . , 322-N, a host ID field 323, a freshness field 324, and/or a digital signature 325), which can correspond to various security features that are enabled by the host security logic and/or the security logic.

The security mode flags 322-0, . . . , 322-N can be predefined sequences of bits that can be used to set a data security value for a group (e.g., a page) of memory cells of the memory device. Examples are not so limited, however, and the security mode flags 322-0, . . . , 322-N can include one or more flags, bit patterns, bit fields (e.g., reduced fields), etc.

In a non-limiting example (e.g., in an example where the number of different security mode flags is 2), there can be three security mode flags 322-0, . . . , 322-N. In this example, a first security mode flag (e.g., SMF 322-0) can enable or disable a message authentication code (MAC) that, when enabled, can be used to verify that the entity transmitting the data transmission 319 is authentic. Continuing with this example, a second security mode flag can enable or disable use of the host ID field 323. Finally, in this example, a third security mode flag (e.g., SMF 322-N) can enable or disable use of the freshness field 324.

The host ID field 323 can include information that uniquely identifies a host, program, and/or application that is requesting access to data stored in the memory device. Use of the host ID field 323 for memory data security can be enabled or disabled by the security mode flags 322-0, . . . , 322-N. For example, if one of the security mode flags 322-0, . . . , 322-N includes a specific bit or bit pattern, use of the host ID field 323 may be enabled or disabled in response to a determination that the security mode flag corresponds to enablement or disablement of the host ID field 323. In some embodiments, the determination may be made by host security logic (e.g., host security logic 260 illustrated in FIG. 2, herein) and/or by security logic (e.g., security logic 270 illustrated in FIG. 2, herein).

The freshness field 324 can include one or more antireplay mechanisms that may be used to ensure a specified level of "freshness" (e.g., to ensure that a request to access data stored in the memory device is current to within a configurable threshold time period. As used herein, "antireplay mechanisms" include monotonic counters, cryptographic nonces, timestamps, etc. that are used to verify the specified level of freshness of a data transmission.

For example, the freshness field 324 may include a timestamp indicating when the data transmission 319 was generated or transmitted. In some embodiments, the freshness field 324 may include a random value (e.g., a cryptographic nonce). The cryptographic nonce may be a random or pseudo-random value that is generated for one time use and included as part of the data transmission as part of an anti-replay protocol. In some embodiments, the freshness field 324 may include a count value that is incremented (e.g., monotonically) as each data transmission 319 is generated. For example, a value associated with the monotonic counter may be included in the freshness field 324 as part of an anti-replay protocol.

Use of the freshness field 324 for memory data security can be enabled or disabled by the security mode flags 322-0, ..., 322-N. For example, if one of the security mode flags 322-0, ..., 322-N includes a specific bit or bit pattern, use of the freshness field 324 may be enabled or disabled in response to a determination that the security mode flag corresponds to enablement or disablement of the freshness field 324. In some embodiments, the determination may be made by host security logic (e.g., host security logic 260 illustrated in FIG. 2, herein) and/or by security logic (e.g., security logic 270 illustrated in FIG. 2, herein).

The digital signature 325 can include a message authentication code (MAC). The MAC can comprise information to authenticate the data transmission 319. In some embodiments, the MAC may be a hash-based message authentication code (HMAC) or any other suitable MAC. The MAC (or HMAC) may be based on a key, such as the host key 261 and/or the key 272 illustrated in FIG. 2, herein. The MAC be generated by the host security logic of the host (e.g., the host security logic 260 illustrated in FIG. 2, herein) or by the security logic of the memory device (e.g., the security logic 270 illustrated in FIG. 2, herein).

For example, depending on whether the data transmission 319 originates at the host or the memory device, the corresponding security logic can generate the digital signature 325. Stated alternatively, if the data transmission 319 originates at the host, the host security logic can generate the digital signature 325, however, if the data transmission 319 originates at the memory device, the security logic can generate the digital signature 325. When the digital signature 325 is generated by the host security logic or the security logic of the memory device, the digital signature may be referred to as an "expected signature." The component receiving the data transmission 319 can calculate a digital signature 325 and compare the digital signature 325 to the expected digital signature to determine if the two signatures match. For example, if the host security logic generates the digital signature 325, the security logic can calculate a digital signature 325 and compare the calculated digital signature 325 to the expected digital signature 325, and vice versa.

Table 1 summarizes a non-limiting example of various data security levels that may be assigned to groups of memory cells, such as pages of memory in the memory device and examples of how expected digital signatures may be generated by the host security logic and/or the security logic based on the foregoing metadata 321 fields. The example illustrated in Table 1 is based on a scenario in which three fields (e.g., the host ID 323, the freshness field 324, and/or the digital signature 325) are enabled and disabled in various combinations. In each column in table 1, the data 320 includes host data, which corresponds to data to be written form the host to the memory device, or read data (e.g., software data, application data, etc.), which corresponds to data to be read from the memory device by the host.

In addition, in Table 1, $SMF_0$, $SMF_1$, and $SMF_2$ correspond to the three security mode flags (e.g., three security mode bit patterns) that may be included as part of the metadata 321 for the data transmission 319. More specifically, in Table 1, $SMF_0$ corresponds to whether usage of a MAC (e.g., an HMAC) is enabled or disabled for a particular data transmission 319 (e.g., $SMF_0=0$ corresponds to MAC usage for the data transmission 319 being disabled, while $SMF_0=1$ corresponds to MAC usage for the data transmission 319 being enabled), $SMF_1$ corresponds to the host ID field 319 being enabled or disabled (e.g., $SMF_1=0$ corresponds to the host ID field 323 being disabled, while $SMF_1=1$ corresponds to the host ID field 323 being enabled), $SMF_2$ corresponds to the freshness field 324 being enabled or disabled (e.g., $SMF_2=0$ corresponds to the freshness field 324 being disabled, while $SMF_2=1$ corresponds to the freshness field 324 being enabled).

TABLE 1

| First Data Security Level | Second Data Security Level | Third Data Security Level | Fourth Data Security Level | Fifth Data Security Level |
|---|---|---|---|---|
| $SMF_0 = 0$ | $SMF_0 = 1$ | $SMF_0 = 1$ | $SMF_0 = 1$ | $SMF_0 = 1$ |
| $SMF_1 = 0$ | $SMF_1 = 1$ | $SMF_1 = 0$ | $SMF_1 = 0$ | $SMF_1 = 1$ |
| $SMF_2 = 0$ | $SMF_2 = 0$ | $SMF_2 = 0$ | $SMF_2 = 1$ | $SMF_2 = 1$ |

As shown in Table 1, a first data security level can be set when each of the security mode flags $SMF_0$, $SMF_1$, and $SMF_2$ are disabled. When the first data security level is set, a digital signature 325 is not appended to the data transmission 319.

As further shown in Table 1, a second data security level can be set when the security mode flag corresponding to usage of a MAC for the data transmission 319 is enabled (e.g., when $SMF_0=1$) and when the security mode bit pattern corresponding the host ID field 323 is enabled (e.g., when $SMF_1=1$). In the second data security level, the freshness field 324 is disabled (e.g., $SMF_2=0$). The digital signature 325 in this case can be generated or calculated using the corresponding security mode bits, the host ID (or application ID), the data 320, and/or a key, such as key 272 illustrated in FIG. 2.

The third data security level can be set when the security mode bit pattern corresponding to usage of a MAC for the data transmission 319 is enabled (e.g., when $SMF_0=1$) and the security mode bit pattern corresponding the host ID field 323 is disabled (e.g., when $SMF_1=0$) and the security mode bit pattern corresponding to the freshness 324 is disabled (e.g., $SMF_2=0$). The digital signature 325 in this case can be generated or calculated using the corresponding security mode flags, the data 320, and/or the key.

The fourth data security level can be set when the security mode flag corresponding to usage of a MAC for the data transmission 319 is enabled (e.g., when $SMF_0=1$), the security mode flag corresponding the host ID field 323 is disabled (e.g., when $SMF_1=0$), and the security mode flag corresponding to the freshness 324 is enabled (e.g., $SMF_2=1$). The digital signature 325 in this case can be generated or calculated using the corresponding security mode flags, the data 320, the freshness field 324, and/or the key.

The fifth data security level can be set when the security mode flag corresponding to usage of a MAC for the data transmission 319 is enabled (e.g., when $SMF_0=1$), the security mode flag corresponding the host ID field 323 is enabled (e.g., when $SMF_1=1$), and the security mode flag bit pattern corresponding to the freshness 324 is enabled (e.g., $SMF_2=1$). The digital signature 325 in this case can be generated or calculated using the corresponding security mode flags, the data 320, the host (or application) ID 323, the freshness field 324, and/or the key.

As described above, the different data security levels (e.g., the first through the fifth data security level in this example) can be set on a page-by-page basis in the memory device (e.g., the memory device 205 illustrated in FIG. 2, herein). For example, a first page of memory in the memory device can be set to the first data security level, a second page of memory in the memory device can be set to the second data security level, etc. By setting different pages of memory to different data security levels, the memory device may be more flexible and/or adaptable to changing criticalities of data handled by the memory device in comparison to some approaches.

Figure 4:
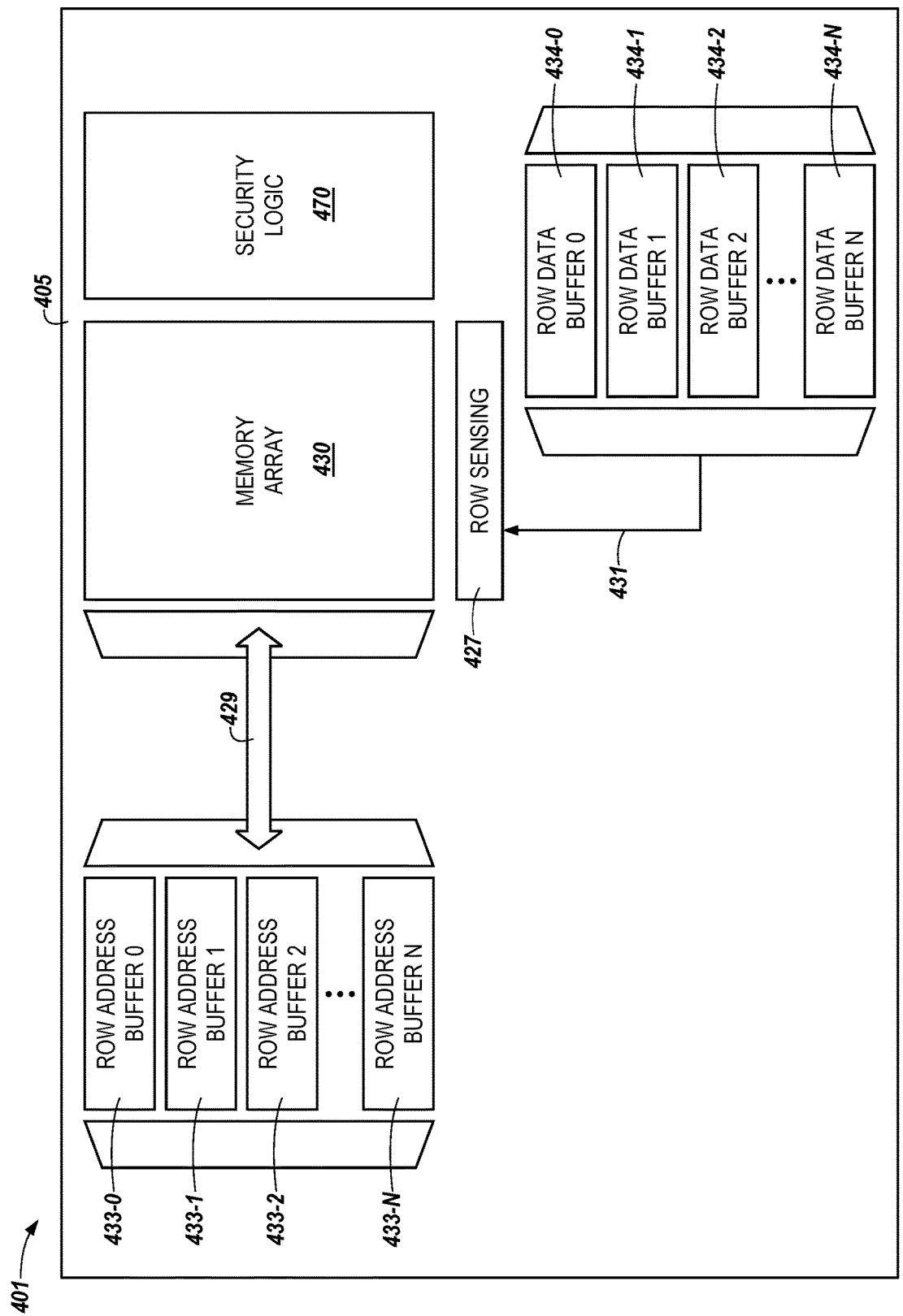
FIG. 4 is a block diagram of a system including a portion of a memory device in accordance with a number of embodiments of the present disclosure.

FIG. 4 is a block diagram of a system 401 including a portion of a memory device 405 in accordance with a number of embodiments of the present disclosure. As shown in FIG. 4, the memory device 405 can include a plurality of row address buffers 433-1, . . . , 433-N that can be communicatively coupled to a memory array 430 via a communication link 429. In addition, the memory device 405 can include a plurality of row data buffers 434-1, . . . , 434-N that can be communicatively coupled to row sensing circuitry 427 via a communication link 431. In some embodiments, the memory device 405 can include security logic 470, which may be analogous to the security logic 270 illustrated in FIG. 2, herein.

As will be appreciated, read access to the memory array 430 can be prepared in advance of performance of a read operation using the row address buffers 433-1, . . . , 433-N and the row data buffers 434-1, . . . , 434-N. Once one or more rows of data (e.g., one or more data transmission, such as the data transmission 319 illustrated in FIG. 3, herein) have been buffered, the data may be written to the memory array 430. For example, once one or more rows of data have been buffered, the data 420 may be written to a particular location, such as a page of memory, of the memory array 430.

Prior to transferring the data transmission (e.g., the row of data) to the memory array 430, the security logic can perform the operations described above to determine if the data transmission is allowed to be written to the memory array 430. For example, the security logic 430 can determine a data security level for the data transmission, calculate a digital signature (e.g., the digital signature 325 illustrated in FIG. 3), and compare the calculated digital signature to an expected digital signature to determine if write access is to be granted for the data transmission. In some embodiments, the row of data can contain approximately 16 KB worth of data 520, however, embodiments are not limited to this specific enumerated value.

The memory device 405 can further include row sensing circuitry 427 which can latch data values associated with a row of data. For example, the sensing circuitry 427 can latch data values received from the row data buffers 434-1, . . . , 434-N and/or transferred to the row data buffers 434-1, . . . 434-N. The row sensing circuitry 427 can include a plurality of latches to facilitate latching of the row of data.

Figure 5:
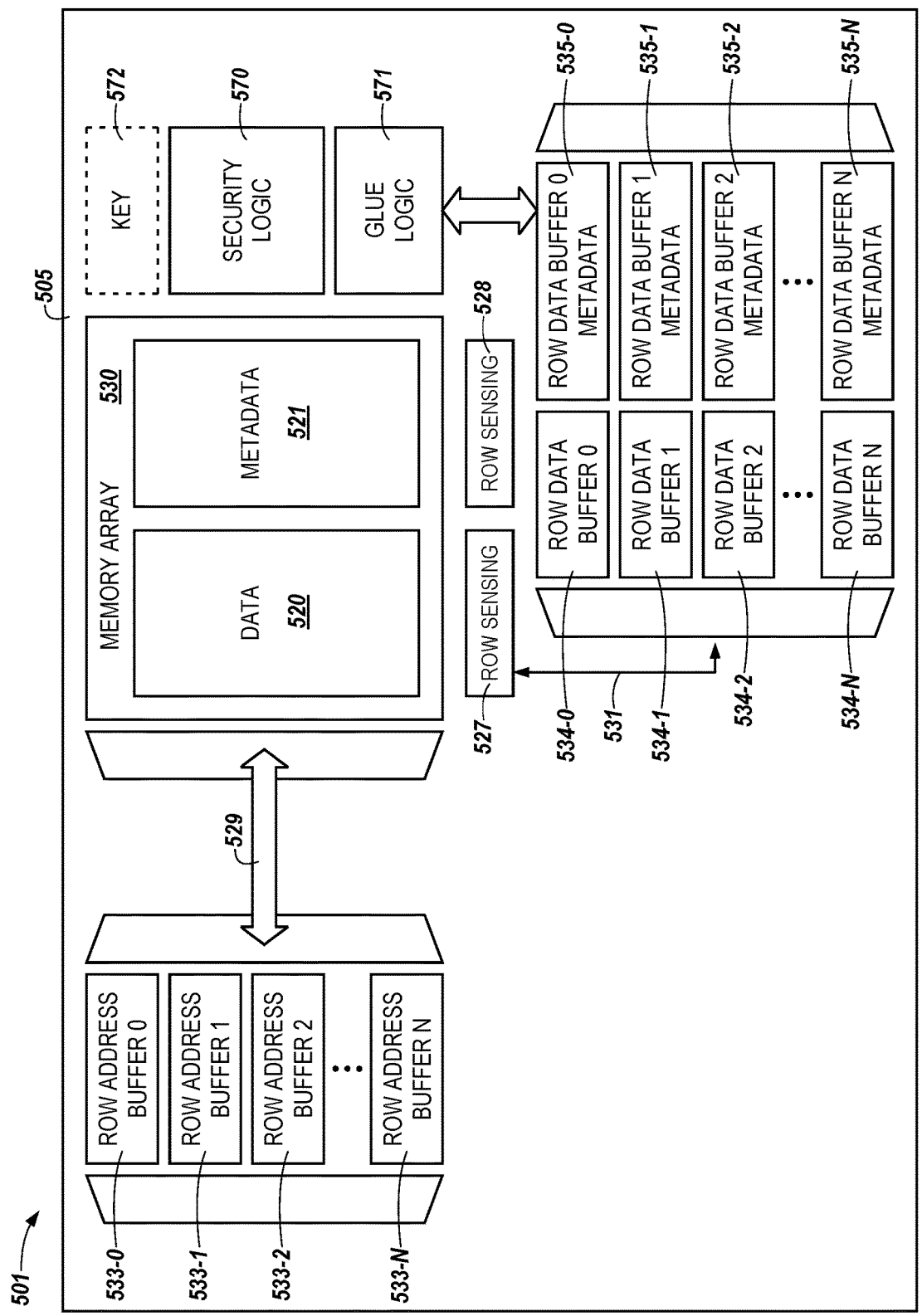
FIG. 5 is another block diagram of a system including a portion of a memory device in accordance with a number of embodiments of the present disclosure.

FIG. 5 is another block diagram of a system 501 including a portion of a memory device 505 in accordance with a number of embodiments of the present disclosure. As shown in FIG. 5, the memory device 505 can include a plurality of row address buffers 533-1, . . . , 533-N that can be communicatively coupled to a memory array 530 via a communication link 529. In addition, the memory device 505 can include a plurality of row data buffers 534-1, . . . , 534-N that can be communicatively coupled to row sensing circuitry 527 via a communication link 531. In some embodiments, the memory device 505 can include security logic 570, which may be analogous to the security logic 270 illustrated in FIG. 2, herein.

The memory device 505 illustrated in FIG. 5 is analogous to the memory device 405 illustrated in FIG. 4, however, in accordance with some embodiments of the present disclosure, the memory device 505 further includes a key 572, which may be analogous to the key 272 illustrates in FIG. 2, glue logic 571, which may be analogous to the glue logic 271 illustrated in FIG. 2, and row data buffer metadata 535-1, . . . , 535-N. The memory array 530 illustrated in FIG. 5 further includes memory locations to store metadata 521, which may be analogous to the metadata 321 illustrated in FIG. 3, herein. In addition, the memory device 505 can include additional row sensing circuitry 528, which may be used to latch data values corresponding to the row data buffer metadata 535-1, . . . , 535-N.

In some embodiments, a quantity of storage locations associated with the memory array 530 illustrated in FIG. 5 may be greater than a quantity of storage locations associated with the memory array 430 illustrated in FIG. 4. For example, the memory array 430 in FIG. 4 may include approximately 16 KB storage locations corresponding to data 520 including approximately 16 KB of data, while the memory array 530 of FIG. 5 may include approximately 16 KB storage locations corresponding to approximately 16 KB of data plus additional storage locations corresponding to the metadata 521.

Similarly, in some embodiments, the row data buffer portion of the memory device 505 can include a greater quantity of storage locations than the row data buffer portion of the memory device 405 in FIG. 4. For example, the row data buffers 434-1, . . . , 434-N in FIG. 4 can include approximately 16 KB storage locations corresponding to approximately 16 KB of data 520, while the row data buffer portion of the memory array 530 in FIG. 5 can include approximately 16 KB storage locations corresponding to approximately 16 KB of data 520 plus additional storage locations corresponding to the row data buffer metadata 535-1, . . . , 535-N.

Figure 6:
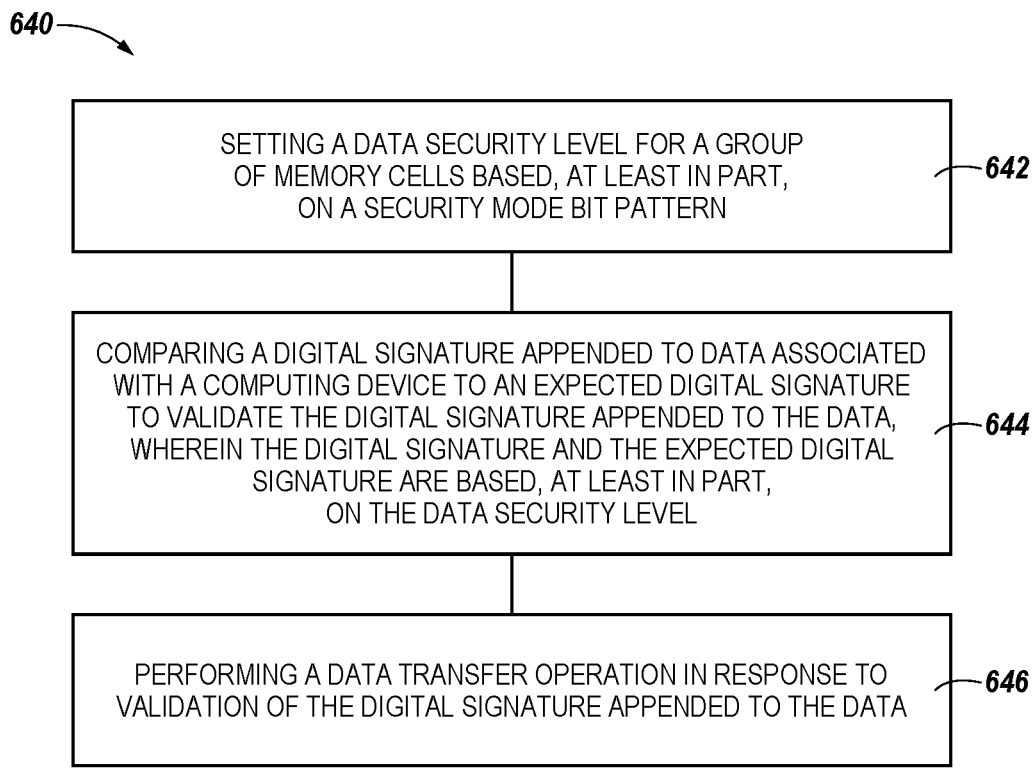
FIG. 6 is a flow diagram representing an example method for memory data security in accordance with a number of embodiments of the present disclosure.

FIG. 6 is a flow diagram 640 representing an example method for memory data security in accordance with a number of embodiments of the present disclosure. At block 642, the method 640 can include setting a data security level for a group of memory cells of a memory device (e.g., memory device 205 illustrated in FIG. 2, herein) based, at least in part, on security mode flags (e.g., a security mode bit pattern). As described above, setting the data security level for the group of memory cells can include setting different data security levels for respective pages of memory cells of the memory device on a page-by-page basis.

At block 644, the method 640 can further include comparing a digital signature appended to data associated with a computing device to an expected digital signature to validate the digital signature appended to the data. In some embodiments, the digital signature and the expected digital signature are based, at least in part, on the data security level.

In some embodiments, comparing the digital signature appended to data associated with the computing device to the expected digital signature to validate the digital signature appended to the data can further include comparing, by security logic associated with the memory device, the digital signature to an expected digital signature generated by a host (e.g., host 202 illustrated in FIG. 2, herein). Conversely, in some embodiments, comparing the digital signature appended to data associated with the computing device to the expected digital signature to validate the digital signature appended to the data can further include comparing, by a host, the digital signature to an expected digital signature generated by security logic associated with the memory device.

At block 646, the method 640 can further include performing a data transfer operation in response to validation of the digital signature appended to the data. In some embodiments, the data transfer operation can include writing data from a host to a memory device. Embodiments are not so limited, however, and in some embodiments, the data transfer operation can include reading data from the memory device to the host.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    receiving, by a memory device, a memory request including metadata comprising:
        security fields corresponding to respective security features associated with the memory device, wherein a first security field includes a first value corresponding to the request and a second security field includes an indication corresponding to which of the respective security features are enabled for the request;
    setting a data security level for a group of memory cells of the memory device based, at least in part, on the indication corresponding to which of the respective security features are enabled for the request;
    determining, by processing circuitry of the memory device, a second value corresponding to the request based on the set data security level; and
    validating the first value by comparing the first value to the second value.

2. The method of claim 1, further comprising receiving, by the memory device, data associated with the memory request based, at least in part, on validation of the first value.

3. The method of claim 2, wherein receiving the data further comprises writing the data associated with the memory request circuitry external to the memory device.

4. The method of claim 1, further comprising comparing, by the processing circuitry, the first value to the second value, wherein the second value is generated by circuitry external to the memory device.

5. The method of claim 1, further comprising comparing, by different processing circuitry, the first value to the second value, wherein the second value is generated by the processing circuitry of the memory device and the second value is generated by the different processing circuitry.

6. The method of claim 1, wherein the group of memory cells comprises a page of memory cells, and wherein setting the data security level for the page of memory cells further comprises setting different data security levels for respective pages of memory cells of the memory device on a page-by-page basis.

7. The method of claim 1, wherein the indication corresponding to which of the respective security features are enabled for the request includes information corresponding to a security mode bit pattern, a host identification field, a data freshness field, or any combination thereof.

8. An apparatus, comprising:
    an array of memory cells;
    control circuitry coupled to the array; and
    security logic coupled to the array and the control circuitry, wherein the security logic is configured to receive signaling indicative of a memory access and comprising:
        a plurality of security fields corresponding to respective security features associated with the apparatus;
        one or more bits corresponding to enablement of respective security features corresponding to the memory access, wherein the security logic is further configured to:
            determine a first value corresponding to metadata associated with data stored in the array; and
            compare the first value corresponding to the metadata to a value generated by circuitry external to the security logic to validate the memory access.

9. The apparatus of claim 8, wherein the security logic is configured to cause data associated with the memory access to be stored in the array based, at least in part, on validation of the memory access.

10. The apparatus of claim 8, wherein the security logic is further configured to cause data associated with the memory request to not be stored in the array based, at least in part, on a failure in validating the memory access.

11. The apparatus of claim 8, wherein the security logic is further configured to set at least one page of the array to a particular data security level based on values of the one or more bits.

12. The apparatus of claim 8, further comprising additional circuitry coupled to the array and the security logic, wherein the circuitry is configured to buffer data associated with the memory access.

13. The apparatus of claim 8, wherein the array is configured to write or read data associated with the memory access using a double data rate interface.

14. The apparatus of claim 8, wherein the one or more bits further correspond to a security mode bit pattern, a data security level, a host identification field, a data freshness field, a digital signature corresponding to data to be stored in the array, or any combination thereof.

15. An apparatus, comprising:
    a memory device; and
    a processor configured to issue a memory request to the memory device, wherein the memory request comprises:
        metadata comprising one or more fields that include information that corresponds to respective security features associated with the memory device and security information associated with the memory request; and one or more bits corresponding to enablement of the respective security features associated with the memory request; and wherein the memory device comprises circuitry to:
determine a security level corresponding to the memory request based on the one or more bits or the security information, or both; and perform an operation to validate the memory request based on the determined security level.

16. The apparatus of claim 15, wherein the circuitry is to compare determined values associated with the metadata to values generated external to the memory device to validate the memory request.

17. The apparatus of claim 15, wherein the circuitry is to execute the memory request based on successful performance of the operation to validate the memory request.

18. The apparatus of claim 15, wherein the circuitry is to abort execution of the memory request based on unsuccessful performance of the operation to validate the memory request.

19. The apparatus of claim 15, wherein the memory request is transferred using a double data rate interface.

20. The apparatus of claim 15, wherein the one or more bits are indicative of a bit pattern corresponding to a data security level, a host identification field, a data freshness field, a digital signature generated by the circuitry deployed on the memory device, or any combination thereof.

* * * * *